(12) United States Patent  
Wu

(10) Patent No.: US 8,607,845 B2  
(45) Date of Patent: Dec. 17, 2013

(54) STRUCTURAL SKELETON OF A VEHICLE SUNSHADE

(76) Inventor: Meizhong Wu, Yiwu (CN)

( * ) Notice: Subject to any disclaimer, the term of this patent is extended or adjusted under 35 U.S.C. 154(b) by 0 days.

(21) Appl. No.: 13/701,238

(22) PCT Filed: Jun. 7, 2011

(86) PCT No.: PCT/CN2011/000952  
§ 371 (c)(1),  
(2), (4) Date: Nov. 30, 2012

(87) PCT Pub. No.: WO2011/153821  
PCT Pub. Date: Dec. 15, 2011

(65) Prior Publication Data  
US 2013/0068399 A1    Mar. 21, 2013

(30) Foreign Application Priority Data  
Jun. 12, 2010  (CN) .......................... 2010 1 0206352

(51) Int. Cl.  
*B60J 1/20*    (2006.01)  
*B60J 7/00*    (2006.01)  
*B62D 25/06*   (2006.01)

(52) U.S. Cl.  
USPC .................................... 160/370.21; 296/99.1

(58) Field of Classification Search  
USPC ............ 160/370.21, 188, 130, 210, 212, 213, 160/218; 296/99.1, 136.05, 136.11, 136.12  
See application file for complete search history.

(56) References Cited

U.S. PATENT DOCUMENTS

| | | | | |
|---|---|---|---|---|
| 4,848,827 A | * | 7/1989 | Ou | 296/99.1 |
| 5,004,290 A | * | 4/1991 | Kim | 296/99.1 |
| 6,904,826 B2 | * | 6/2005 | Hesener | 74/483 R |
| 2009/0072578 A1 | * | 3/2009 | Wang | 296/136.12 |
| 2013/0068399 A1 | * | 3/2013 | Wu | 160/98 |

FOREIGN PATENT DOCUMENTS

| | | |
|---|---|---|
| CN | 2494769 | 6/2002 |
| CN | 1611380 | 5/2005 |
| CN | 101088789 | 12/2007 |
| CN | 101234596 | 8/2008 |
| CN | 201132488 | 10/2008 |
| CN | 101890898 | 11/2010 |
| CN | 201745418 | 2/2011 |

* cited by examiner

*Primary Examiner* — Blair M Johnson  
*Assistant Examiner* — Jaime F Cardenas-Garcia  
(74) *Attorney, Agent, or Firm* — Hamre, Schumann, Mueller & Larson, P.C.

(57) ABSTRACT

A vehicle awning framework comprises a base stand (1), above which a pair of driving axles (2) is parallelly arranged from the front to the rear. A pair of driving axle supports (3) is sleeved on each driving axle(2). Two shaft gears(4) are sleeved respectively at the two ends of said driving axle(2), and respectively fixedly connected with a driving axle supports(3). The two ends of the driving axle (2) are respectively fixedly connected with a gear connection connectors (5) through which a laterally-turning axle (6) rotated around the gear connecting connectors (5) is arranged. The laterally-turning axle (6) rotates around itself when it turns outward, so that laterally-turning shafts (8) on the laterally-turning axle (6) are spread to the left and right sides, and the awning can be closed and folded entirely along with the turning of the laterally-turning shafts (8). Therefore the vehicle awning framework can be operated automatically and easily.

7 Claims, 4 Drawing Sheets

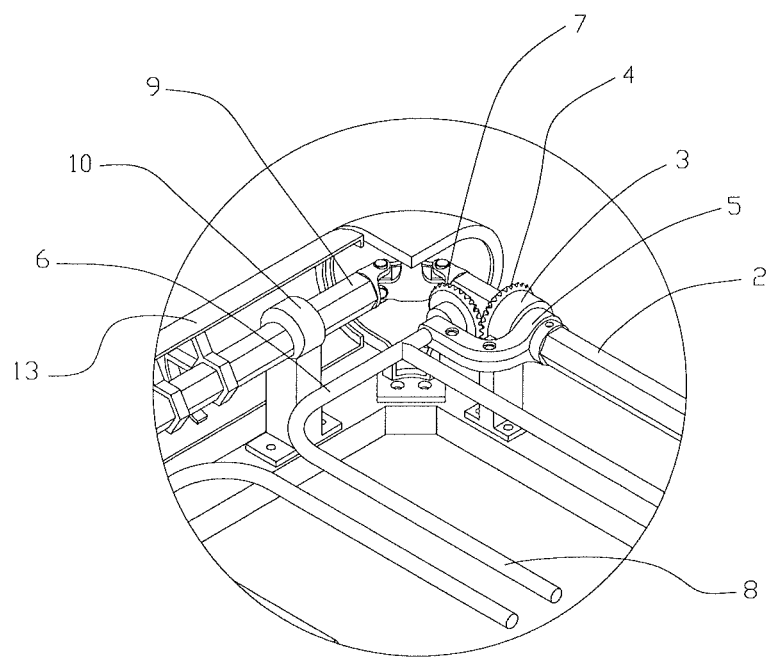
FIG 3
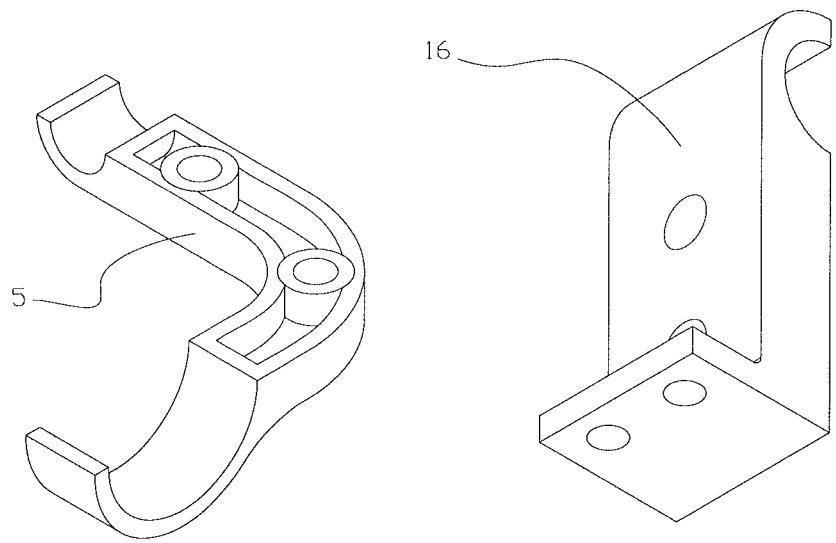
FIG 4
FIG 5

STRUCTURAL SKELETON OF A VEHICLE SUNSHADE

TECHNICAL FIELD

The present invention is related to a sunshade, in particular, to the structural skeleton of a vehicle sunshade provided for easy, automatic retraction and extension control.

BACKGROUND OF THE INVENTION

The number of personal vehicles in China is growing daily. When cars are parked under the sun, the metal plates of the car body rapidly absorb heat, causing the cabin temperature to rise quickly, which leads to more energy consumed in reducing such high temperatures. Therefore, there is a wide demand for vehicle sunshades, of which various types are available. For example, Chinese Patent Application No. 01228188.3 presents a vehicle sunshade that is attached to a supporting stand on a car roof with left and right piston valves also attached to the roof. The piston shafts are connected to the sunshade fabric and are controlled hydraulically. In addition, Chinese Patent Application No. 200310101651.1 presents a vehicle sunshade utilizing a suction cup for securing a supporting stand with the sunshade fabric attached. The first type of sunshade mentioned utilizes hydraulics with the sunshade fabric installed inside the axle, which is likely to cause jamming when leading the fabric out; the structure for the sunshade is also overly complicated, which requires greater driving power. The second type is simpler in structure, but bulky in size; therefore, despite the fact that the suction cup is arranged on the car trunk and the area of sunshade is greater, the sunshade fabric is supported by the supporting stand fixed to the car roof, resulting in reduced cover for the car window areas.

To overcome the drawbacks associated with the above types of vehicle sunshades, the Applicant have designed a vehicle sunshade after much research and development. The sunshade is disclosed in Chinese Patent No. 200720312179.X and is comprised of a supporting stand and sunshade fabric secured to the supporting stand. The supporting stand includes a frame on the car roof and moveable supporting shafts that are attached to the frame. At least one supporting shaft is attached per side on the front, rear, left and right sides of the frame. The sunshade fabric is then attached to the support shafts on the four sides of the frame so that it can provide cover for the car windows. In addition, by supporting the sunshade fabric with a raised stand, cover can be achieved while maintaining air flow. Since the supporting shafts are movable, they can be turned and folded into the frame. The simple structure of the system allows the supporting shafts to be placed on the car roof when the sunshade is not in use; when it comes time to use the sunshade, the shafts can then be repositioned. One can see that the vehicle sunshade designed by the Applicant can solve the drawbacks associated with the two aforementioned types of vehicle sunshades. However, during practical use, it has been found that the sunshade fabric at the four corners cannot be easily folded for storage due to difficulties during the turning and folding of the supporting shafts. The folding and storing requires manual manipulation, which makes the system somewhat inconvenient in practical use and presents difficulties for the addition of automatic controls.

SUMMARY OF THE INVENTION

The present invention seeks to overcome the technical problems associated with the folding of the sunshade fabric at the corners of the frame when storing, the inconvenience involved in folding and storing, and the difficulties present in the addition of automatic controls. This is accomplished by providing a structural skeleton of a vehicle sunshade such that the sunshade fabric attached to the skeleton can be completely folded for storage and can be controlled automatically for convenient use.

The aforementioned technical problems can be overcome by the solutions built into the present invention. The invention consists of a structural skeleton for the vehicle sunshade, comprised of a base stand on top of which are fixed a pair of front and rear driving axles mounted parallel to each other, and a pair of driving axle supporters mounted on the driving axles which are attached to the base stand; the two ends of the driving axles are mounted with an axial gear attached to the driving axle supporters, around which the driving axles rotate; the two ends of the driving axles are each attached to gear connectors, and lateral-turning axles are mounted to and rotate around the gear connectors; the lateral-turning axles are drawn through the gear connectors and are connected to a turning gear, which correspondingly engages the axial gear; the lateral-turning axles further are attached to lateral-turning shafts; the top of the base stand is fitted with a pair of driven axles, which are attached perpendicularly to the two sides of the driving axles; these driven axles are then fitted with driven axle supporters, which are in turn attached to the base stand; the driven axles rotate about the driven axle supporters, and the driven axles are fitted with lateral-blocking support shafts. During operation, the front and rear driving axles are connected to an external power source and rotate when actuated. During actuation, the rotation of the driving axles would also cause the gear connectors attached to the driving axles to rotate outward; since the lateral-turning axles are mounted on the gear connectors, the lateral-turning axles would also rotate with the gear connectors, opening in both the front and back; since the lateral-turning axles are connected to the turning gears, and the axial gears and driving axle supporters are firmly attached to the base stand, the axial gears and the driving axle supporters will remain stationary during the rotation of the driving axles. Since the turning gears are engaged with the axial gears, the lateral-turning axles will self-rotate during outward rotations so that the lateral-turning shafts on the lateral-turning axles will extend outward to the left and right sides. The two sides of the driving axles are fitted with driven axles that are able to rotate simultaneously with the driving axles. Of course, the driven axles may be independently connected and driven by the external power source, which the rotates the lateral-blocking support shafts toward each side so that the lateral-turning shafts and the lateral-blocking support shafts can be either extended or folded in sequence. During practical use, the sunshade fabric can be attached to the lateral-turning shafts and the lateral-block support shafts such that the sunshade fabric is able to cover and shade the two sides of the vehicle from the extension of the lateral-turning shafts and the lateral-blocking support shafts. In this way, the sunshade fabric can extend and retract along with the rotation of the lateral-turning shafts and the lateral-blocking support shafts in order to overcome the folding difficulties associated with the corners of the existing sunshade, while avoiding the hassles of manual manipulation and making it more suitable for automatic controls, which enhances the overall performance of the product.

To make the sunshade smaller when folded for storage, the driven axles and the driving axles are preferably arranged on the same plane, and the ends of the driven axles and the driving axles are connected with cardan joint. By connecting the ends of the driven axles and the driving axles with cardan joint, the two axles can be synchronized for simultaneous movements with a simpler, more stable structure, while reducing the necessary number of outside power sources.

Preferably, the driven axles are also fitted with lateral-blocking boards, which are arranged perpendicular to the lateral-blocking supporting shafts. The lateral-blocking boards can rotate with the driven axles, and when the lateral-blocking support shafts are folded in, the lateral-blocking boards can cover the driven axles to prevent the sunshade fabric on the lateral-blocking support shafts from being lifted by the wind when the vehicle is travelling at a high speed.

Preferably, the front and rear driving axles are fitted with a front blocking frame and a rear blocking board. The front blocking frame and the rear blocking board are mounted with fastening means, to which the lateral-turning axles are mounted in a way that still allows the axles to rotate. The front blocking frame and the rear blocking board provide cover for the front windshield and rear windshield of the vehicle. Also, the lateral-turning axles are mounted on the fastening means while still maintaining the ability to rotate. This is done so that during the outward rotation and self-rotation of the lateral-turning axles, the lateral-turning axles are supported at no less than two points; this allows for greater stability during the extension and folding processes.

Preferably, the lateral-turning axles are arranged on the axis of the turning gear and are also arranged perpendicular to the driving axles. The turning gear and the axial gear can rotate cooperatively so that the self-rotation of the lateral-turning axle is more stable. This facilitates the extension and folding in of the lateral-turning shafts.

Preferably, the front blocking frame and the rear blocking board are arranged parallel to the front and rear driving axles, which facilitates the shading of the sun at the front and rear windshields of the vehicle once the sunshade is extended.

Preferably, the front blocking frame comprises a shutter. As such, the shading parts are provided with greater air flow, facilitating the further reduction of the vehicle temperature.

Preferably, the connecting points of the driving axles and the driven axles are provided with protective corners, and the bottoms of the protective corners are attached to the base stand. The protective corners can provide better protection for the cardan joint.

In view of the above and in comparison to the known technology, the present invention possesses the following merits: 1 as the lateral-turning axles generates self-rotation during its outward rotation, the lateral-turning shafts of the lateral-turning axles can extend outward to the left and right sides so that the sunshade fabric can be folded along with the rotation of the lateral-turning shafts, making it easy for automatic controls and convenient for use; 2 by connecting the ends of the driven axles and the driving axles with cardan joint, the two axles are able to rotate simultaneously in a simple, stable structure; 3 as the lateral-turning axles are arranged on the axis of the turning gear and perpendicular to the driving axles, during the cooperative rotation between the turning gear and the axial gear, the self-rotation of lateral-turning axle is able to drive the extension and folding of the lateral-turning shafts more stably.

DESCRIPTION OF THE DRAWINGS

FIG. 3 is an enlarged view of Part A in FIG. 2;

FIG. 4 is a structural view taken along a cross sectional line through the center of the gear connector;

FIG. 5 is a structural view taken along a cross sectional line through the center of the fastening means;

DESCRIPTION OF THE PREFERRED CONFIGURATIONS OF THE INVENTION

Details of the technical solution of the present invention are further provided in the following, and will include descriptions of the configurations along with the accompanying drawings.

Figure 2:
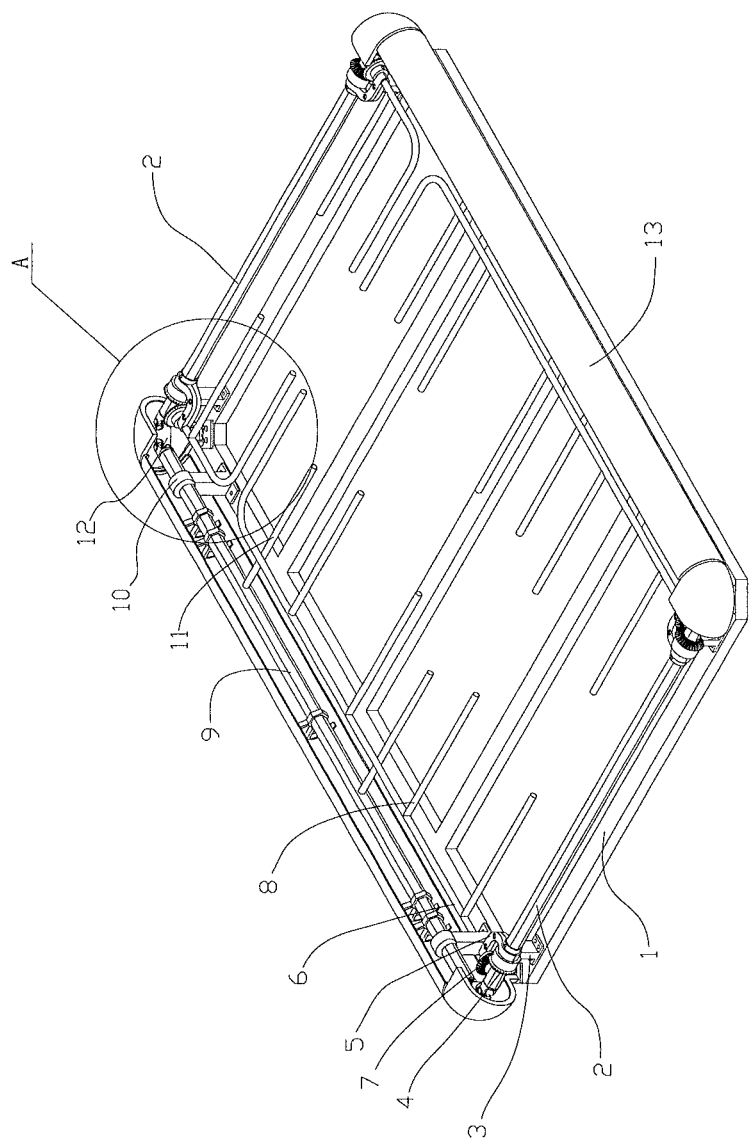
FIG. 2 is a structural view showing the present invention in its retracted configuration without the front blocking frame and the rear blocking board.

Configurations:

Configuration 1: A structural skeleton of a vehicle sunshade. The square base stand 1 is comprised of a pair of front and rear driving axles 2 parallel to each other; a pair of driving axle supporters 3 are mounted on the driving axles 2, and the driving axle supporters 3 are attached to the base stand 1. The left and right ends of the driving axles 2 are mounted with an axial gear 4, which is attached to the driving axle supporters 3; the driving axles 2 rotate about the driving axle supporters 3 and the axial gear 4; the two ends of the driving axles 2 are attached to gear connectors 5; lateral-turning axles 6 are mounted on the gear connectors 5 and may rotate about the gear connectors 5; the lateral-turning axles 6 pass through the gear connectors 5 and are connected to a turning gear 7, as shown in FIGS. 2, 3, and 4; the lateral-turning axles 6 are arranged on the axis of the turning gear 7 and arranged perpendicular to the driving axles 2. The turning gear 7 is engaged with the axial gear 4, as shown in FIG. 3; the lateral-turning axles 6 are fitted to lateral-turning shafts 8, where the length of the lateral-turning shafts 8 is between 20 and 40 mm.

Figure 1:
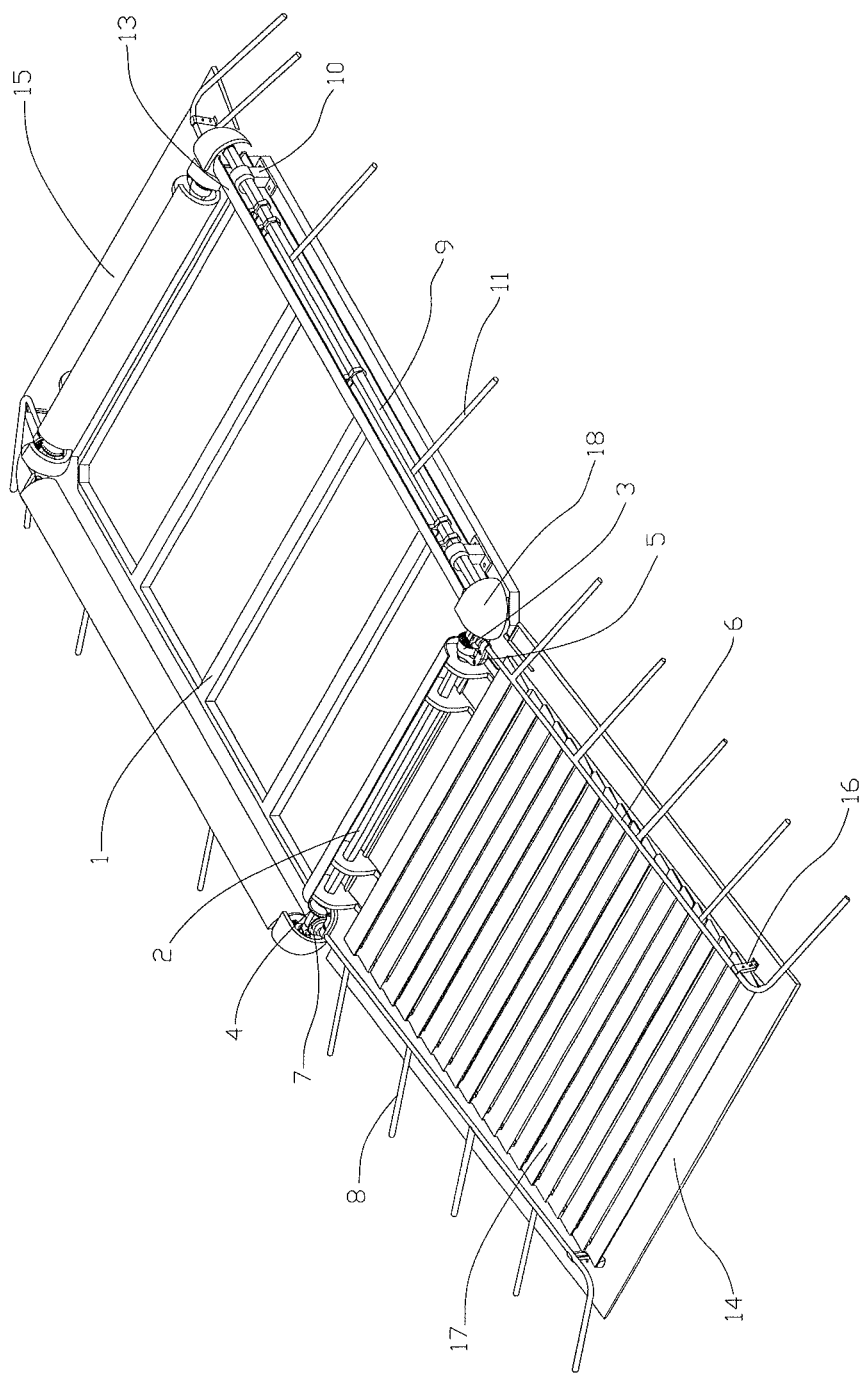
FIG. 1 is a structural view showing the present invention in its extended configuration.

During the operation, the front and rear driving axles 2 are connected to an external power source and are rotated when actuated by the power source. Due to the gear connectors 5 on the two ends of the driving axles 2 being attached to the driving axles, the rotation of the driving axles also causes the gear connectors 5 to rotate outward; since the lateral-turning axles 6 are mounted on the gear connectors 5, the lateral-turning axles rotate with the gear connectors, opening in both the front and back; the lateral-turning axles 6 are connected to the turning gears 7; the axial gears 4 and the driving axle supporters 3 are firmly attached to the base stand 1, so during the rotation of the driving axles, the axial gears 4 and the driving axle supporters 3 remain stationary. Since the turning gears 7 are engaged with the axial gears 4, the lateral-turning axles 6 are able to self-rotate during outward rotations so that the lateral-turning shafts 8 on the lateral-turning axles 6 are able to extend outward to the left and right sides, as shown in FIG. 1.

The top of the base stand 1 is also fitted with a pair of driven axles 9. These driven axles 9 are attached on the two sides of the driving axles 2 and are arranged perpendicular to the driving axles 2; the driven axles 9 are mounted with two driven axle supporters 10, which are attached to base stand 1; the driven axles 9 can rotate about the driven axle supporters 10, and the driven axles 9 are further comprised of lateral-blocking support shafts 11, as shown in FIGS. 1 and 2. On the two sides of the driving axles 2, there are driven axles 9 that are able to rotate simultaneously with the driving axles 2 via cardan joint 12. Certainly, the driven axles can rotate on their own while being driven by external power, following which the lateral-blocking support shafts 11 are rotated to two sides such that the lateral-turning shafts 8 and the lateral-blocking support shafts 11 can be extended or folded in sequence.

The driven axles 9 and the driving axles 2 are arranged on the same plane so that the sunshade can be folded and stored in a smaller size. The ends of the driven axles and the driving axles are connected with cardan joint 12, as shown in FIG. 2. The lateral-blocking boards 13 can rotate with the driven axles 9, and as the lateral-blocking support shafts 11 are folded, the lateral-blocking boards can cover the driven axles to prevent the sunshade fabric on the lateral-blocking support shafts from being lifted away by the wind when the vehicle is travelling at a high speed.

The front and rear driving axles 2 are fitted with a front blocking frame 14 and a rear blocking board 15. The front blocking frame 14 and the rear blocking board 15 are provided with fastening means 16, and the lateral-turning axles 6 are mounted on the fastening means 16 so as to maintain the ability to rotate, as shown in FIGS. 1 and 5. The front blocking frame 14 and the rear blocking board 15 are arranged parallel to the front and rear driving axles 2. The front blocking frame and the rear blocking board provide cover for the front windshield and rear windshield of the vehicle. Also, the lateral-turning axles 6 are mounted on the fastening means 16 so as to maintain the ability to rotate. This is done so that during the outward rotation and self-rotation of the lateral-turning axles 6, the lateral-turning axles are supported at no less than two points; this allows for greater stability during the extension and folding processes.

The front blocking frame 14 is fitted with a shutter 17, as shown in FIG. 1. As such, the shading parts are provided with greater air flow, facilitating the further reduction of the vehicle temperature. The connecting points of the driving axles 2 and the driven axles 9 are provided with protective corners 18, which are attached to the base stand 1, as shown in FIGS. 1 and 2. The protective corners can provide better protection to the cardan joint.

Figure 6:
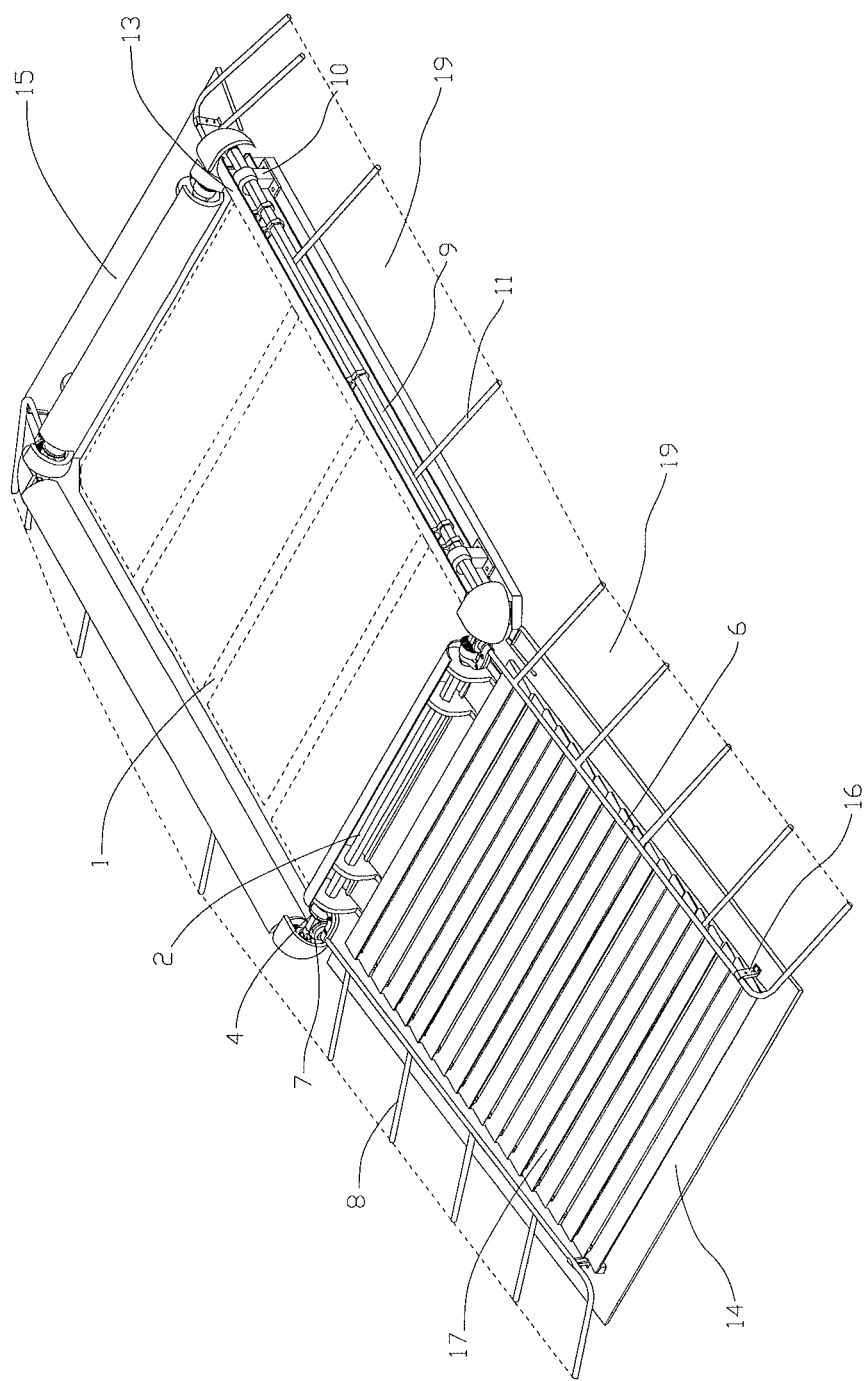
FIG. 6 is a reference view showing the use of the present invention with the sunshade fabric attached.

During its practical use, the sunshade fabric 19 is attached to the lateral-turning shafts 8 and the lateral-blocking supporting shafts 11 as well as to the square frame of the base stand 1, as shown in FIG. 6. Areas where the lateral-turning shafts 8 are adjacent to the lateral-blocking support shafts can use elastic sunshade fabric 11 to facilitate the folding and storage of the lateral-turning shafts 8 and the lateral-blocking support shaft 11. The extensions of the lateral-turning shafts 8 and the lateral-blocking support shaft 11 can precisely cover the two sides of the vehicle while the front blocking frame 14 and the rear blocking board 15 can be used to shade the front windshield and rear windshield of the vehicle. In this way, the sunshade fabric 19 can fold completely along with the rotations of the lateral-turning shafts and the lateral-blocking support shafts; this overcomes the folding and storage difficulties at the corners of the existing sunshade, while avoiding the hassles of manual manipulation and making it more suitable for automatic controls, which enhances the overall performance of the product.

It is obvious that any skilled engineer may modify and alter the present invention in various ways. However, such modifications and alternations shall not deviate from the scope of the present invention. Any obvious modifications are considered to be within the scope of the claims of the present invention.

The invention claimed is:

1. A structural skeleton of a vehicle sunshade, comprising:
a rectangular base stand;
a front driving axle and a rear driving axle mounted parallel to each other at one set of opposite ends of the base stand;
the front and the rear driving axles are each attached to the base stand by a plurality of driving axle supports, one of said plurality of driving axle supports located at each end of said driving axles, said driving axles rotating about said driving axle supports;
an axial gear and a gear connector are also attached to each end of each driving axle;
a lateral-turning axle is mounted on and can rotate about each gear connector;
said lateral-turning axle passing through each gear connector and connecting to a turning gear, which engages the axial gear;
each lateral-turning axle connected with a respective lateral-turning shaft by way of a bend;
a pair of driven axles mounted parallel to each other at the other opposite ends of the base stand;
said driven axles are each attached to the base stand by a plurality of driven axle supports, one of said plurality of driven axle supports located at each end of said driven axles, said driven axles rotating about said driven axle supports, each driven axle further comprising at least one lateral-blocking support shaft; and
said driven axles are perpendicular to said driving axles, said driven and driving axles lie on the same horizontal plane, said driven and driving axle ends connected to each other by a cardan joint.

2. The structural skeleton of claim 1 wherein the driven axles are positioned perpendicular to the at least one lateral-blocking support shaft.

3. The structural skeleton of claim 1 wherein the front and rear driving axles are attached to a front blocking frame and a rear blocking board, respectively.

4. The structural skeleton of claim 1 wherein each of the lateral-turning axles is positioned perpendicular to the driving axles.

5. The structural skeleton of claim 3 wherein the front blocking frame and rear blocking board are positioned parallel to the front and rear driving axles, respectively.

6. The structural skeleton of claim 3 wherein a shutter is attached to the front blocking frame.

7. The structural skeleton of claim 1 wherein the connected ends of the driving axles and driven axles are fitted with protective corners, said protective corners are attached to the base stand.

* * * * *